United States Patent
Gerhardt et al.

(10) Patent No.: US 8,978,946 B2
(45) Date of Patent: Mar. 17, 2015

(54) ROOF BAR FOR A MOTOR VEHICLE

(75) Inventors: Torsten Gerhardt, London (GB); John K. Harding, Leigh-on-Sea (GB); Steve David Fleming, Hockley (GB); Danny Edward Stanesby, Benfleet (GB); Alicia Agius, Romford (GB); Will Farrelly, Chelmsford (GB)

(73) Assignee: Ford Global Technologies, Dearborn, MI (US)

( * ) Notice: Subject to any disclaimer, the term of this patent is extended or adjusted under 35 U.S.C. 154(b) by 1422 days.

(21) Appl. No.: 12/403,586

(22) Filed: Mar. 13, 2009

(65) Prior Publication Data
US 2010/0230452 A1    Sep. 16, 2010

(51) Int. Cl.
*B60R 9/045* (2006.01)
*B60R 9/052* (2006.01)

(52) U.S. Cl.
CPC .............. *B60R 9/045* (2013.01); *B60R 9/052* (2013.01)
USPC ............ 224/321; 224/282; 224/314; 224/549

(58) Field of Classification Search
CPC ........... B60R 2011/0085; B60R 9/045; F16M 11/38; B60N 3/102
USPC ................. 224/311, 321, 282, 549, 553, 314; 296/37.5, 37.7; 16/267; 292/137, 138, 292/145; 211/204, 169.1, 198; 248/346.3
See application file for complete search history.

(56) References Cited

U.S. PATENT DOCUMENTS

| | | | | |
|---|---|---|---|---|
| 666,941 A * | 1/1901 | Streit | ............................ | 248/459 |
| 1,500,345 A * | 7/1924 | Spurrier | ........................ | 292/32 |
| 1,573,579 A * | 2/1926 | Ross | ............................. | 292/145 |
| 2,886,271 A * | 5/1959 | Williamson | ................... | 224/309 |
| 3,165,353 A * | 1/1965 | Weise | ............................ | 296/210 |
| 3,199,765 A * | 8/1965 | Locke | ......................... | 229/103.2 |
| 3,606,230 A * | 9/1971 | Hargreaves | .............. | 248/346.01 |
| 3,891,262 A * | 6/1975 | Brunel | ............................. | 296/3 |
| 4,120,181 A * | 10/1978 | Stubbings | ........................ | 70/58 |
| 4,362,258 A * | 12/1982 | French | .......................... | 224/309 |
| 4,807,924 A * | 2/1989 | Kottke | .......................... | 296/164 |
| 4,981,319 A * | 1/1991 | Gerzeny et al. | ............ | 296/26.07 |

(Continued)

FOREIGN PATENT DOCUMENTS

CA    2277358 A1 *    1/2001
DE    3719974 A1 *    12/1987

(Continued)

*Primary Examiner* — J. Gregory Pickett
*Assistant Examiner* — John Cogill
(74) *Attorney, Agent, or Firm* — Jerome R. Drouillard; Jason Rogers

(57) ABSTRACT

A roof bar (10) for a motor vehicle (1) has an elongate load carrying member (213) and a single elongate stay (214) which are hingedly connected to a roof (5) of the motor vehicle (1) by a pair of base plates (211). The elongate load carrying member (213) is selectively held in a deployed position by a latch mechanism (222, 255) which latches a castellated edge of the elongate load carrying member (213) to a castellated edge of the single elongate stay (214) along a significant portion of the interface between the two components (213, 214) so as to provide a strong support for any loads carried by the roof bar (10). The components (211, 213, 214) forming the roof bar (10) are all relatively thin and the elongate load carrying member (213) and the single elongate stay (214) are arranged to fold flat on the roof (5) of the motor vehicle (1) so as to minimize any change in vehicle height when the roof bar (10) is stowed.

12 Claims, 14 Drawing Sheets

(56) References Cited

U.S. PATENT DOCUMENTS

| | | | |
|---|---|---|---|
| 5,096,106 A * | 3/1992 | Foster et al. | 224/321 |
| 5,190,337 A * | 3/1993 | McDaniel | 296/3 |
| 5,303,858 A * | 4/1994 | Price | 224/405 |
| 5,431,472 A * | 7/1995 | Coffland | 296/3 |
| 5,439,152 A * | 8/1995 | Campbell | 224/405 |
| 5,511,709 A * | 4/1996 | Fisch | 224/321 |
| 5,749,436 A * | 5/1998 | Satchwell, III | 182/127 |
| 6,029,873 A * | 2/2000 | Won et al. | 224/321 |
| 6,126,220 A * | 10/2000 | Brasher | 296/26.04 |
| 6,332,637 B1 * | 12/2001 | Chambers | 296/3 |
| 6,435,594 B1 * | 8/2002 | Ekonen et al. | 296/100.09 |
| 6,676,175 B2 * | 1/2004 | Jaeb et al. | 292/116 |
| 6,769,728 B2 * | 8/2004 | Albaisa et al. | 296/37.7 |
| 6,877,790 B2 * | 4/2005 | Queveau et al. | 296/108 |
| 7,118,165 B2 * | 10/2006 | Nelson et al. | 296/186.2 |
| 7,322,629 B2 * | 1/2008 | McClintock | 296/37.14 |
| 7,344,025 B2 * | 3/2008 | Belden et al. | 206/308.2 |
| 7,422,130 B2 * | 9/2008 | Shaukat | 224/316 |
| 7,451,627 B2 * | 11/2008 | Horngren et al. | 70/57.1 |
| 7,537,125 B2 * | 5/2009 | Plouchart | 211/70.6 |
| 7,699,372 B2 * | 4/2010 | Adams et al. | 296/26.07 |
| 7,758,091 B1 * | 7/2010 | McCall | 296/3 |
| 7,789,410 B1 * | 9/2010 | White | 280/293 |
| 7,798,381 B2 * | 9/2010 | Moreau et al. | 224/314 |
| 2002/0125728 A1 * | 9/2002 | Chambers | 296/3 |
| 2004/0195866 A1 * | 10/2004 | Fin | 296/210 |
| 2007/0039985 A1 * | 2/2007 | Warren et al. | 224/321 |
| 2007/0283855 A1 * | 12/2007 | Pozzi | 108/44 |

FOREIGN PATENT DOCUMENTS

| | | | |
|---|---|---|---|
| DE | 3826662 A1 * | 2/1990 | |
| DE | 4018009 A1 * | 12/1991 | |
| DE | 19954835 A1 * | 5/2001 | |
| DE | 10203677 A1 * | 8/2003 | |
| EP | 2048033 A1 * | 4/2009 | |
| FR | 2862584 A1 * | 5/2005 | |
| GB | 2455088 A * | 6/2009 | |
| JP | 11334477 A * | 12/1999 | |

* cited by examiner

ROOF BAR FOR A MOTOR VEHICLE

CROSS REFERENCE TO RELATED APPLICATIONS

None.

BACKGROUND OF THE INVENTION

1. Field of the Invention

This invention relates to a motor vehicle and in particular to a roof bar for carrying a load on a roof of the motor vehicle.

2. Related Art

It is known to provide a motor vehicle with two or more removable roof bars in order to carry objects on the roof of a motor vehicle such as, for example, a roof box, a ladder, scaffold poles, scaffold planks and long lengths of timber. It is a problem with a removable roof bar that considerable time and effort is required to fit or remove the roof bar from the vehicle.

It is a further problem that such fixed but removable roof bars greatly increase the height of the vehicle when they are fitted and, as such, removable roof bars are not ideal for use on a light commercial vehicle such as a van where it is desirable to keep the height of the vehicle below the height restrictions commonly imposed at car park entrances when no load is to be carried on the roof.

It would be an advantage to provide a stowable roof bar for a motor vehicle that is quick and easy to deploy or stow and does not significantly increase the overall height of the vehicle when it is stowed.

SUMMARY OF THE INVENTION

According to a first aspect of the invention there is provided a stowable roof bar for a motor vehicle having an elongate load carrying member pivotally connected to a roof of the vehicle so as to extend across the vehicle, and a latch mechanism to selectively hold the elongate load carrying member in a deployed state in which a crossbar portion of the elongate load carrying member is spaced above the roof of the vehicle, wherein a single elongate stay is latchable by means of the latch mechanism to the elongate load carrying member along the length of the elongate load carrying member to hold the roof bar (10) in the deployed state.

This has the advantage that a strong roof bar is produced.

The elongate stay may be of substantially the same length as the elongate load carrying member.

The elongate load carrying member may include a crossbar portion and an end portion at each end of the crossbar portion, with the single elongate stay including a central portion and a support portion at each end of the central portion.

The end portions of the elongate load carrying member may project above the crossbar so as to provide end stops for the crossbar.

The elongate load carrying member may be H-shaped.

The elongate load carrying member may have a castellated edge formed on the crossbar portion and may be latchable by means of the latch mechanism to a castellated edge of the central portion of the single elongate stay so as to form a load bearing support when the roof bar is in the deployed state.

The central portion of the single elongate stay may be latched along its entire length to the crossbar portion of the elongate load carrying member by the latch mechanism.

The single elongate stay may be latchable by means of the latch mechanism to the elongate load carrying member at several spaced apart positions along the entire length of the elongate load carrying member so as to hold the elongate load carrying member of the roof bar in the deployed state.

The roof bar may further include a pair of base plates used to fasten the roof bar to a roof of the motor vehicle, with each of the base plates having a respective support portion of the single elongate stay pivotally connected to it near to one end and a respective end portion of the elongate load carrying member pivotally connected to it near an opposite end.

The latch mechanism may be operable from one end of the roof bar so as to permit the roof bar to be stowed or deployed from one side of the vehicle to which it is fitted.

The latch mechanism may include an axially slideable J-shaped rod that is moveable between an unlocked position in which it is engaged only with the castellations of the elongate load carrying member and a locked position in which it is engaged with the castellations of the elongate load carrying member and the castellations of the single elongate stay.

When the single elongate stay is unlatched from the elongate load carrying member, the elongate load carrying member may be rotatable in one rotational direction so as to lie flat on the roof of the vehicle to which the roof bar is fitted and the single elongate stay is rotatable in an opposite rotational direction so as to lie flat on the roof of the vehicle.

The crossbar portion may be asymmetrical in cross-section having a thickness that is considerably less than the width of the crossbar portion so as to minimize the increase in vehicle height when the roof bar is stowed, while retaining a high resistance to bending when a load is carried on the roof bar in the deployed position. This has the advantage of providing a low stowed height without compromising bending resistance when in use.

The roof of the motor vehicle may have a high point and a low point, and the roof bar is fitted so as to be stowable in a open ended transverse channel in the roof of the vehicle wherein the thickness of the components forming the roof bar are such that, when the roof bar is moved to a stowed state, no part of the stowed roof bar is located below the low point of the roof and above the high point of the roof. This has the advantage that the overall height of the motor vehicle is not increased by the stowed roof bars. This has the further advantage that the channel into which the stowed roof bar is fitted is self draining.

The thickness of the elongate load carrying member and the single elongate stay may be such that, when the latch mechanism is released so as to permit the roof bar to be moved to a stowed state in which the elongate load carrying member and the elongate stay are folded flat on the roof of the vehicle in a transverse open ended channel, the highest point of the stowed roof bar is lower than a high point on the roof of the motor vehicle so that the overall height of the vehicle is not increased.

According to a second aspect of the invention there is provided a motor vehicle having a roof in which at least two roof bars constructed in accordance with said first aspect of the invention are attached to the roof of the motor vehicle in a spaced apart relationship.

The roof of the motor vehicle may have a high point and a low point corresponding to a height below which a surface is not self draining and a number of transverse open ended channels each sized to accommodate a stowed roof bar, each of the channels having a base surface located no lower than the low point of the roof such that, when each roof bar fitted to the roof of the vehicle is moved to its respective stowed state, no part of each stowed roof bar is located higher than the high point of the roof so that the overall height of the motor vehicle is not increased by the stowed roof bars and no part of each roof bar is located lower than the low point of the roof.

The roof may have a convex central portion bounded on each side by a longitudinally extending drainage ditch and the low point of the roof may correspond to the height of the drainage ditches.

Each of the channels may have a base surface located no lower than the height of the drainage ditches so as to ensure that it is self draining.

BRIEF DESCRIPTION OF THE DRAWINGS

FIG. 12b is an enlarged view in the region indicated by the arrow E on FIG. 12a.

FIG. 13b is an enlarged view in the region indicated by the arrow E on FIG. 13a.

FIG. 14b is an enlarged view in the region indicated by the arrow E on FIG. 13a.

FIG. 15a is a partial side view in the direction of arrow D on FIG. 12a.

DETAILED DESCRIPTION OF THE PREFERRED EMBODIMENTS

With particular reference to FIGS. 1 to 4b show a motor vehicle, 1, having a roof, 5, upon which is mounted two spaced apart identical stowable roof bars, 10.

Figure 1:
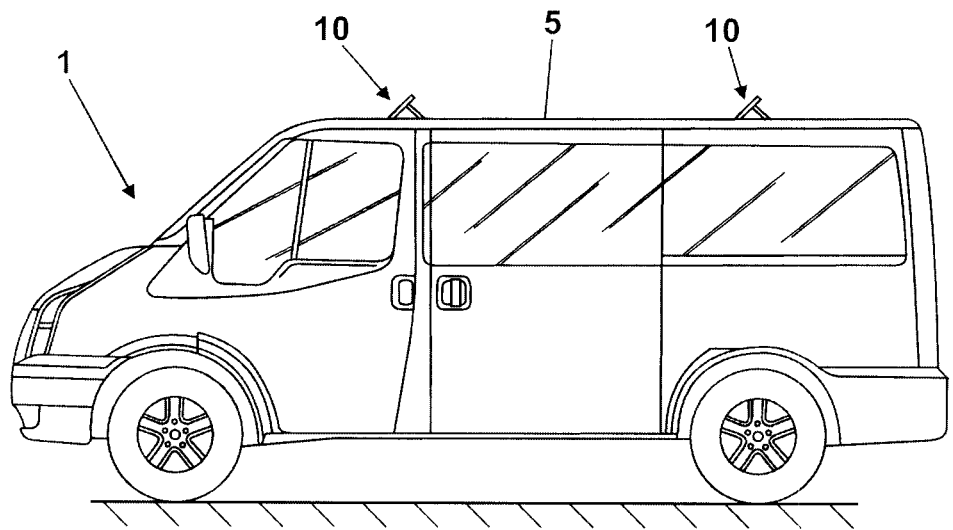
FIG. 1 is a side view of a motor vehicle according to an aspect of the present invention.
Figure 2:
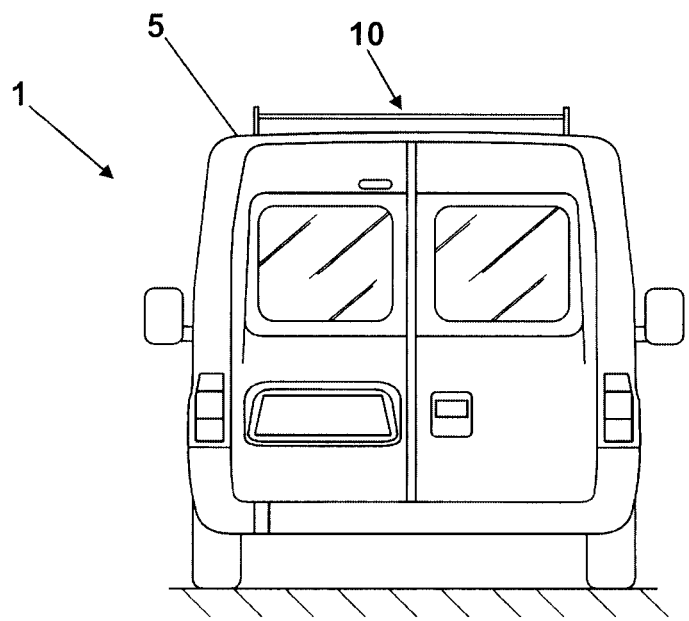
FIG. 2 is rear view of the motor vehicle shown in FIG. 1.
Figure 3A:
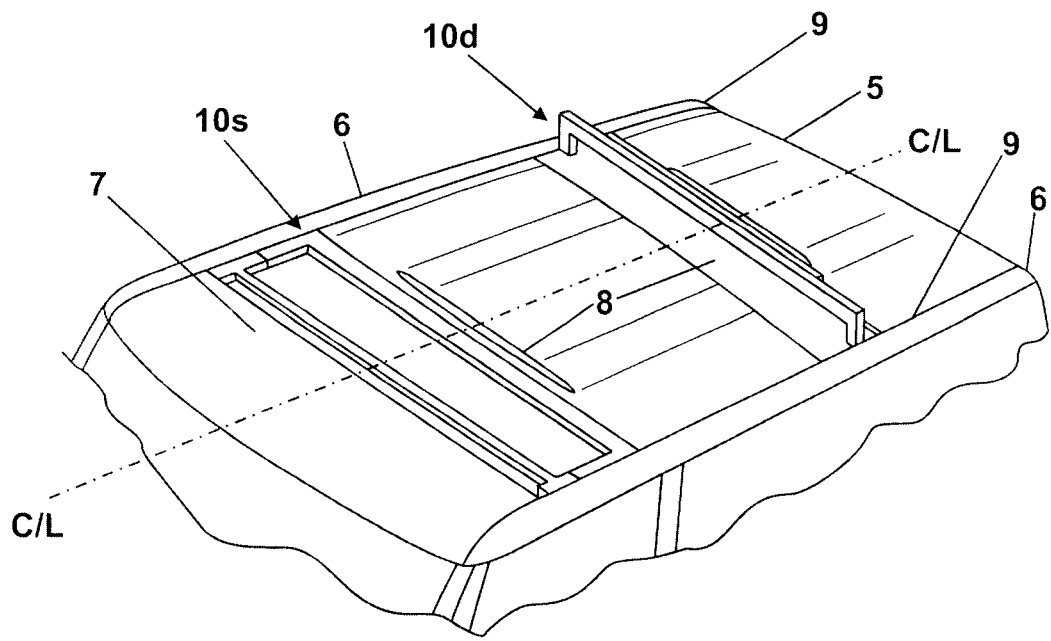
FIG. 3a is a pictorial schematic view of a roof of the vehicle shown in FIGS. 1 and 2 showing two transverse open ended channels and a roof bar according to the invention in deployed and stowed states.
Figure 3B:
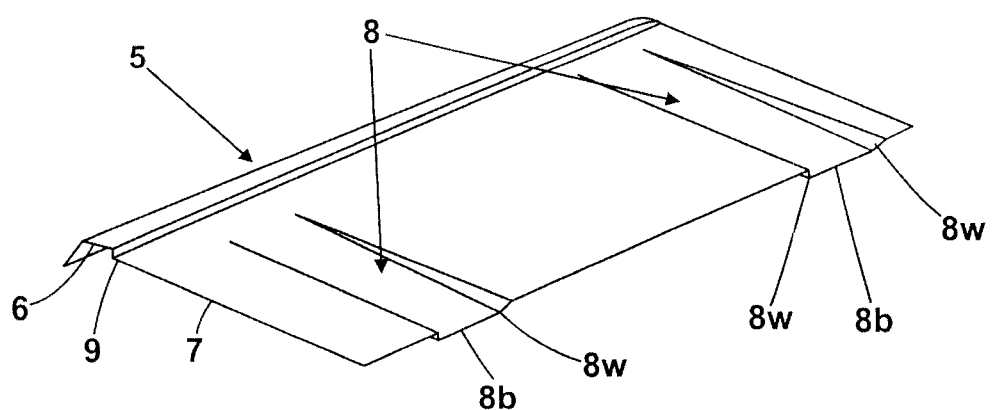
FIG. 3b is a pictorial view of the right hand side of the roof shown in FIG. 3 but with no roof bars in place.

Each of the roof bars 10 is reversibly moveable between a stowed state, indicated by the reference numeral 10s on FIG. 3a, and a deployed state, indicated by the reference numeral 10d on FIG. 3a, wherein it is retainable by a latch mechanism.

In FIGS. 1 to 3a the motor vehicle is in the form of a van and is shown with two roof bars 10 fitted to its roof 5, but it will be appreciated that more than two roof bars 10 could be fitted to roof 5.

Roof 5 includes a convex central portion, 7, bounded on each longitudinal side by a drainage ditch, 9, two channels 8 each having side surfaces, 8w, and a base surface, 8b, and a ridge, 6, running longitudinally along both outer edges of the roof 5.

Figure 4A:
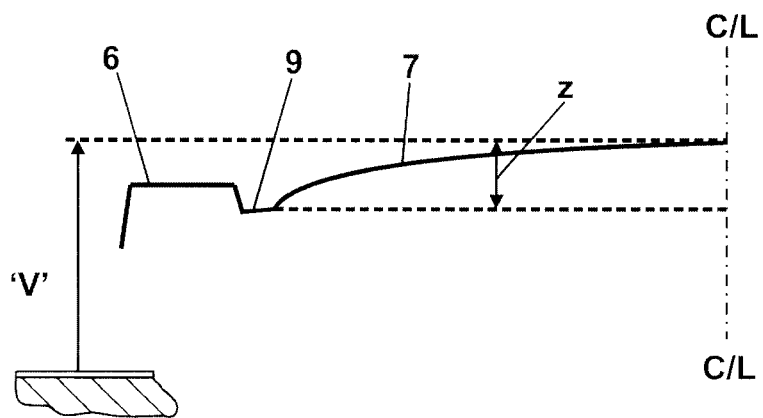
FIG. 4a is a partial transverse cross sectional view of the roof shown in FIG. 3b in which the dimensions and curvature have been greatly exaggerated.
Figure 4B:
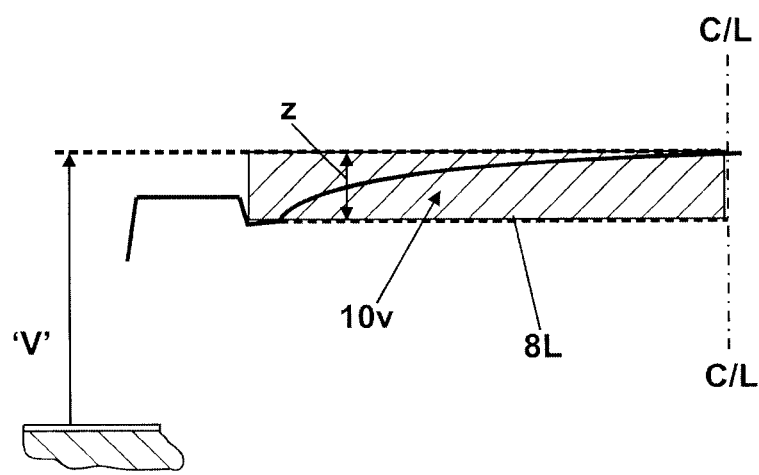
FIG. 4b is a view similar to that of FIG. 4a showing a possible stowage volume for a roof bar according to the invention.
Figure 5:
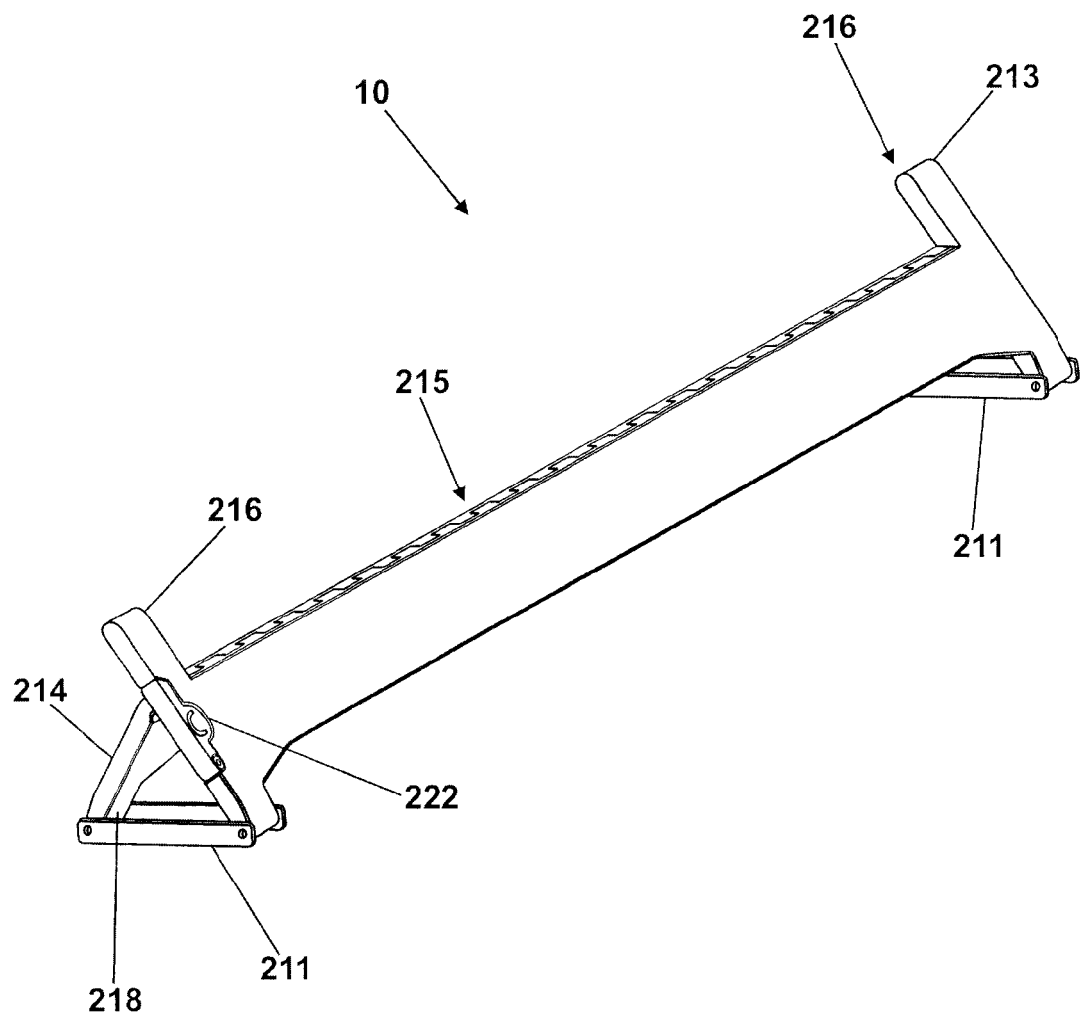
FIG. 5 is a pictorial view of a roof bar according to the invention showing the roof bar in a deployed state.
Figure 6:
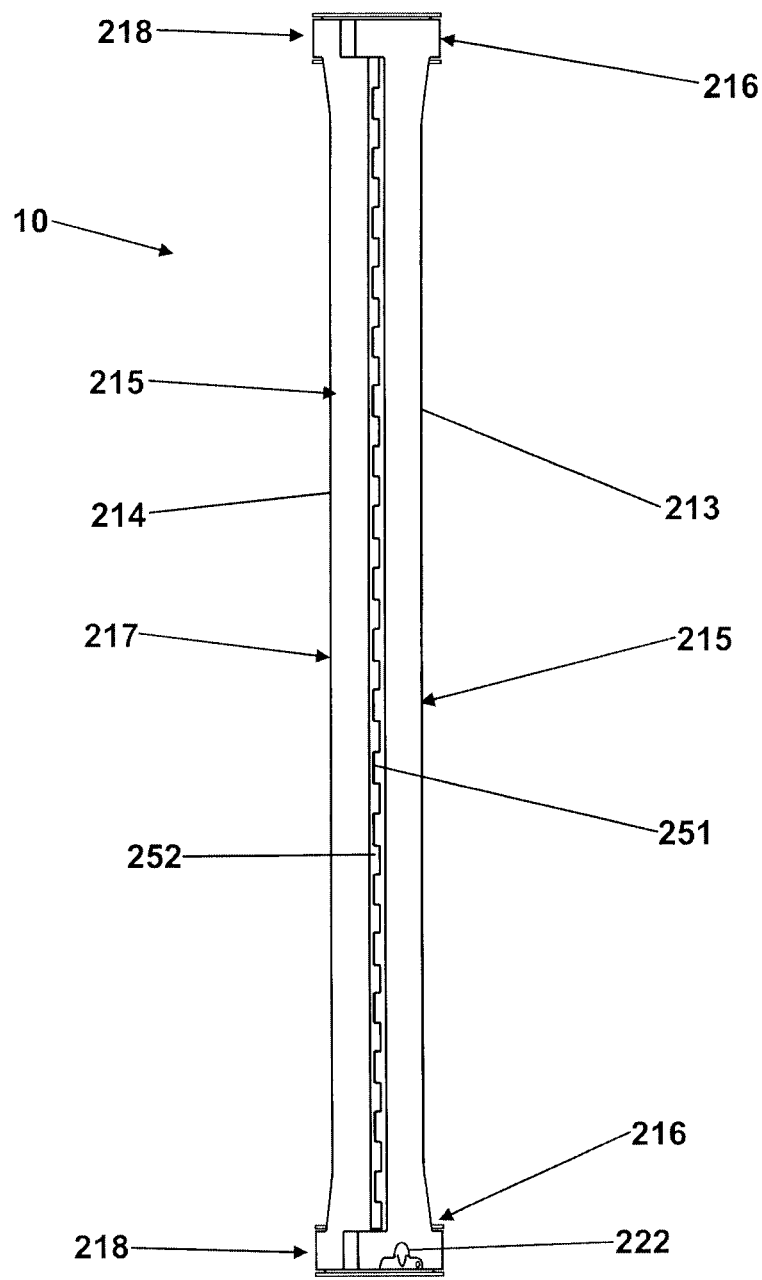
FIG. 6 is a plan view of the roof bar shown in FIG. 5.

Referring now to FIGS. 4a and 4b, central roof portion 7 has a high point or crown located on the centre line C/L of vehicle 1 and, in this case, this is also the highest point of vehicle 1 and so defines the overall height 'V' of vehicle 1. It will however be appreciated that with some roof forms the height of the ridges 6 may determine the overall height of the vehicle 1.

In the case wherein the high point is determined by the height of the ridges 6, there will be a difference in height between the high point of central roof portion 7 and the highest point of vehicle 1 and this difference in height may be sufficient in some cases to package a stowed roof bar in accordance with this invention. However, in most cases, this difference will not be sufficient to permit a stowed roof bar to be stowed without increasing the vehicle height.

If, as shown, ridges 6 are lower than the overall height 'V' of the vehicle as determined by the high point of central roof portion 7, a number of the channels 8 must be formed in central roof portion 7 so as to provide sufficient volume in which to stow each roof bar 10 so that, when roof bars 10 fitted to the roof of the vehicle 1 are moved to their respective stowed states, no part of the stowed roof bars 10 is located higher than the high point of the roof 5 so that the overall height 'V' of the vehicle 1 is not increased by the stowed roof bars 10. Such channels could also be used, even if the high point is the ridges, to provide an increased volume for stowing roof bars 10.

Roof 5 has a low point corresponding to a height below which the surface is not self draining, and each roof bar 10 must be stowed on a surface that is no lower than the low point of roof 5 so that the surface is self draining and to reduce drag, wind noise and improve the aesthetic appearance of the vehicle.

As the low point of the roof 5 corresponds to the height of the drainage ditches 9, each of channels 8 must have base surface 8b located no lower than the height of the drainage ditches 9 so as to ensure that channels 8 are self draining.

In FIGS. 4a and 4b the dimension z represents the vertical height between the level of drainage ditches 9 and the high point of roof 5, and it is this space that can be utilized by incorporating channels 8 into roof 5 to stow a roof bar 10. FIG. 4b shows as a shaded area 10v the volume that can be occupied by a stowed roof bar 10 without increasing the overall height 'V' of vehicle 1. Line 8L corresponds to the minimum height of base surface 8b that must be maintained if the corresponding channel 8 is to be self draining. Therefore, although a roof bar formed in accordance with this invention can be used on many types of roof depending upon their respective configuration and is not limited to a roof having the profile shown, it is desirable for roof 5 to have a number of open ended channels 8 because these can be used to assist with stowage of roof bars 10 by providing an additional stowage volume.

With reference to FIGS. 5 to 15b there is shown in greater detail roof bar 10 according to this invention. Roof bar 10 includes an elongate load carrying member 213 pivotally connected to roof 5 of vehicle 1 so as to extend across vehicle 1. A single elongate stay 214 is pivotally connected to roof 5, and to a latch mechanism to selectively latch single elongate stay 214 to elongate load carrying member 213 so as to hold elongate load carrying member 213 in a deployed state in which a crossbar portion 215 of elongate load carrying member 213 is spaced above roof 5.

Elongate load carrying member 213 is H-shaped and includes crossbar portion 215 and two end portions 216 located at opposite ends of the crossbar portion 215. The end portions 216 are used to space the crossbar 215 above the roof 5 when the roof bar 10 is in the deployed state and to provide end stops for the crossbar 215 so as to prevent an item secured to the roof bar 10 from sliding off either end of the crossbar 215. That is to say, the end portions 216 of the elongate load carrying member 213 project above the crossbar portion 215 when the roof bar 10 is in use so as to provide end stops for the crossbar portion 215.

Single elongate stay 214 is of substantially the same length as the elongate load carrying member 213 so as to span substantially the entire width of vehicle roof 5 to which roof bar 10 is fitted. Single elongate stay 214 is substantially U-shaped and includes a central portion 217 and a respective support portion 218 at each end of the central portion 217.

Elongate stay 214 is latchable to the elongate load carrying member 213 to hold the roof bar 210 in the deployed state and the central portion 217 of the elongate stay 214 has a number of castellations 252 formed along one edge so as to form a castellated edge. The crossbar 215 of the elongate load carrying member 213 also has a number of castellations 251 formed along one edge so as to form a castellated edge for intermeshing engagement with a corresponding castellated edge of the elongate stay 214.

The castellated edge of the elongate load carrying member 213 is latchable by means of a latch mechanism 222, 255 to the castellated edge of the elongate stay 214 so as to form a load bearing support when roof bar 210 is in the deployed state. The arrangement of the castellated edges of cross bar portion 215 and the central portion 217 of the elongate stay 214 means that the cross bar portion is latched to the elongate stay 214 along substantially its entire length, thereby producing a very strong interconnection.

The latch mechanism includes an axially slideable J-shaped rod, 255, that is moveable by a handle, 222, between an unlocked position in which it is engaged only with the castellations 251 of the elongate load carrying member 213, and a locked position in which it is engaged with the castellations 251 of the elongate load carrying member 213 and the castellations 252 of the single elongate stay 214.

An advantage of this latch mechanism is that it can be operated from one end of roof bar 10, thereby allowing a user to deploy or stow roof bar 10 from one side of vehicle 1 in a simple manner without the need to walk round the vehicle to release latches on opposite sides of the vehicle, or requiring two people to release latches on opposite sides of the vehicle 1.

Figure 9:
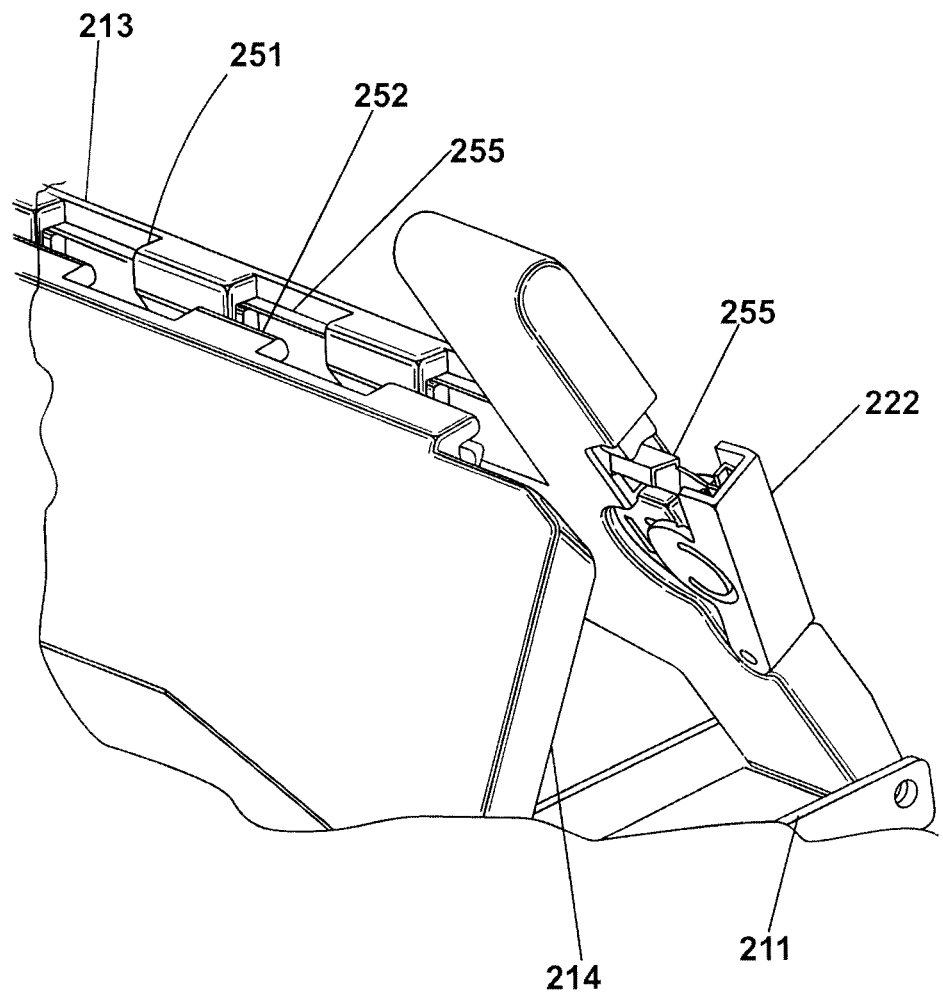
FIG. 9 is an enlarged pictorial view of an end portion of the roof bar showing a latch mechanism in an unlatched position.
Figure 10:
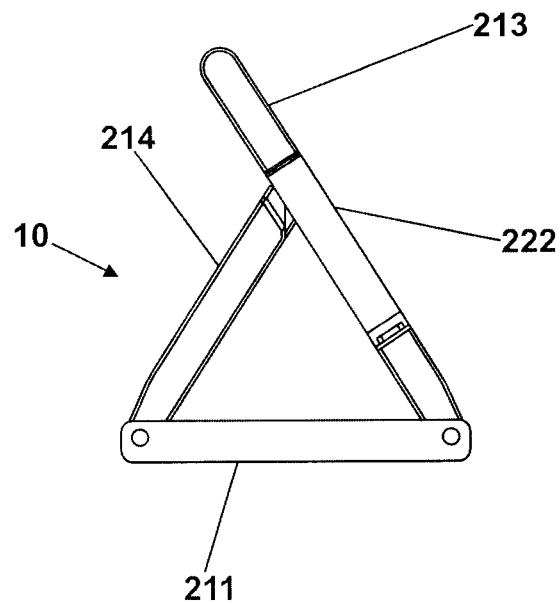
FIG. 10 is an end view of the roof bar shown in FIG. 5.
Figure 15A:
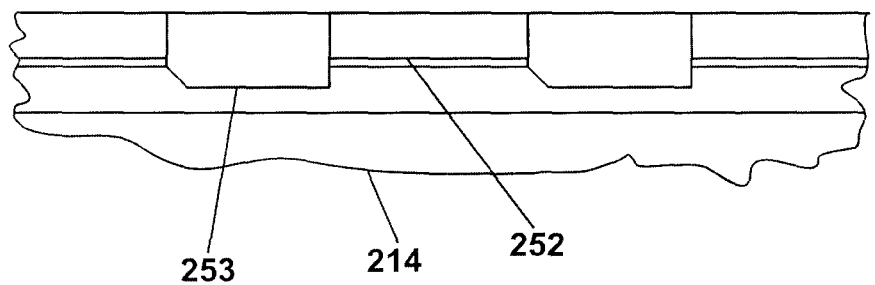
Figure 15B:
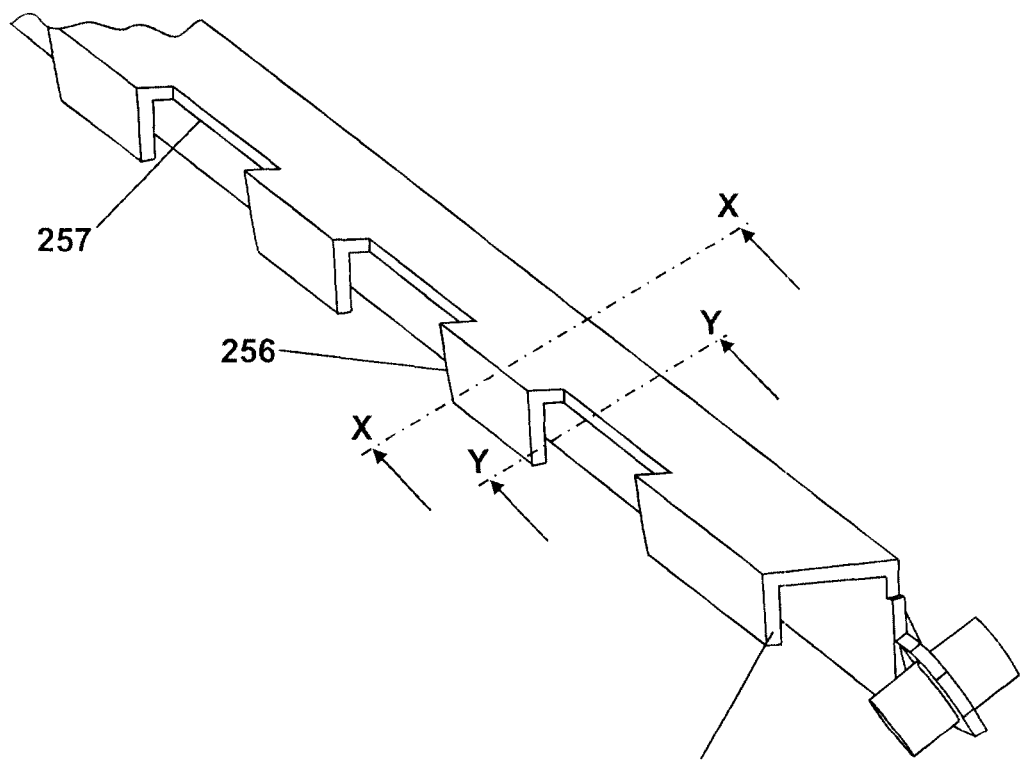
FIG. 15b is a partial pictorial view of part of the latch mechanism used to latch the stay and the elongate load carrying member together when the roof bar is in the deployed state.

As can best been seen with reference to FIGS. 9, 15a and 15b, rod 255 has a number of castellations 256 formed by cut-outs 257. Each of the castellations 256 is sized such that when the rod 255 is moved to the unlatched position the castellations 256 lie primarily within the castellations 251 on the elongate load carrying member 213. If the elongate stay 214 is brought into contact with the elongate load carrying member 213, the castellations 251 engage with cut-outs 253 defining the castellations 252 on the elongate stay 214 and the cut-outs 257 in the J-shaped rod 255 can slide into engagement with the castellations 252.

By axially moving the rod 255, the castellations 256 on the rod 255 engage with the castellations 252 on the elongate stay 214, thereby locking the two components together.

Figure 12A:
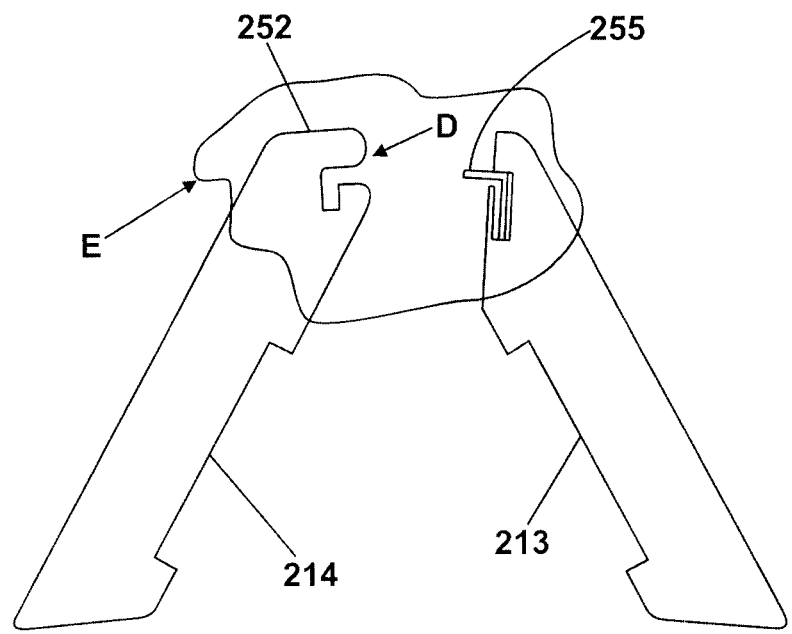
FIG. 12a is a partial cross-section through the roof bar corresponding to the position of one castellation formed in a stay member showing a latch mechanism in an unlatched state and the stay member separated from a elongate load carrying member.
Figure 12B:
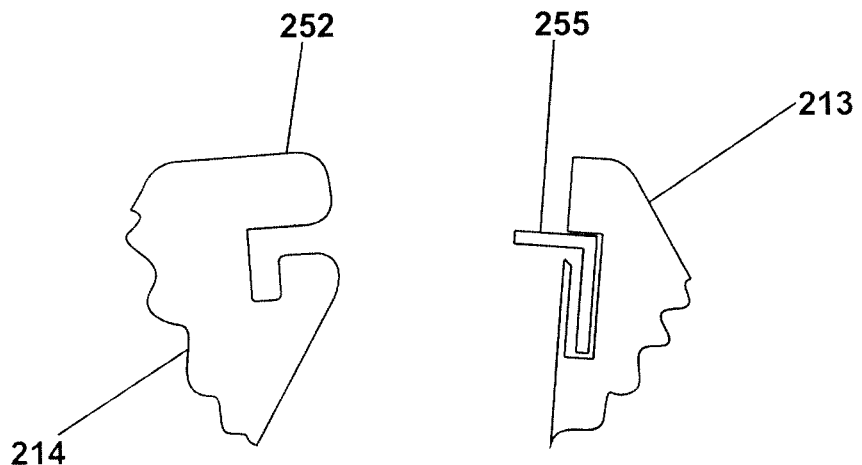

FIGS. 12a and 12b show the situation when the elongate load carrying member 213 and the stay 214 are separated ready for securing together. The section corresponds to a section through one of the castellations 252 on the elongate stay 214 and to the section y-y on FIG. 15b.

Figure 13A:
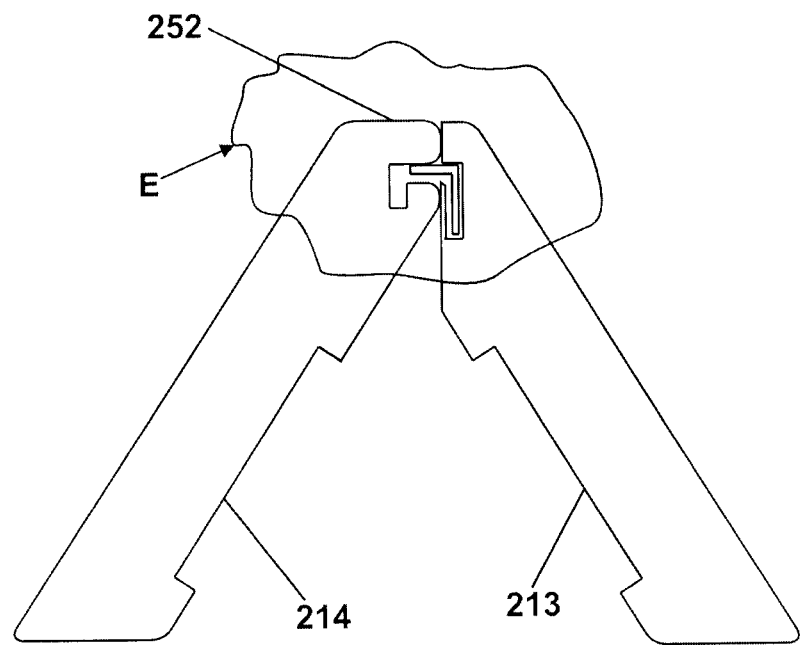
FIG. 13a is a partial cross-section similar to FIG. 12a but showing the stay member abutting the elongate load carrying member prior to latching.
Figure 13B:
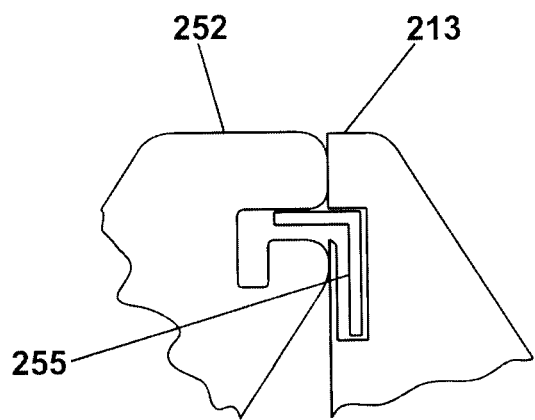

FIGS. 13a and 13b show the situation prior to latching when the elongate load carrying member 213 and the stay 214 have been brought together to form the deployed state. The section corresponds to a section through one of the castellations 252 on the elongate stay 214 and to the section y-y on FIG. 15b.

Figure 14A:
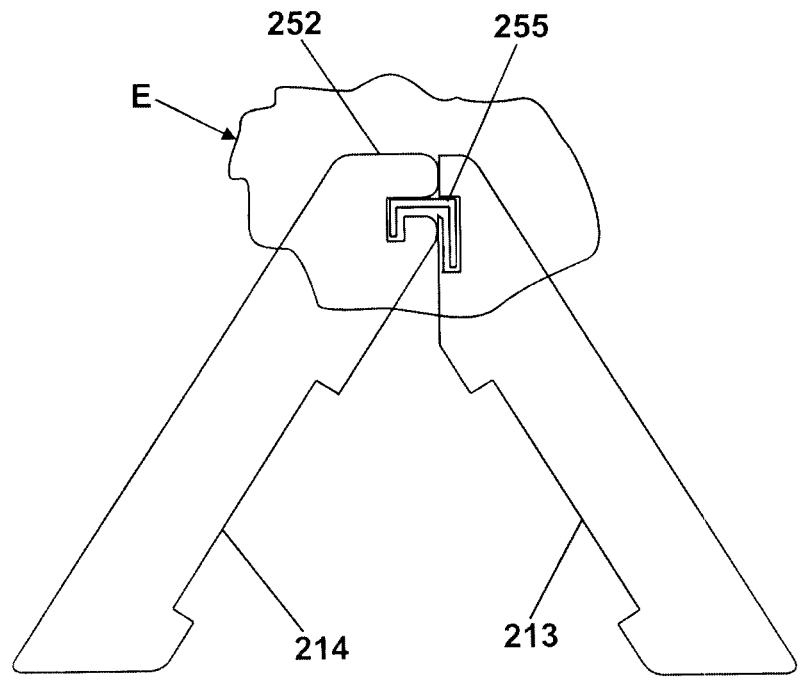
FIG. 14a is a partial cross-section similar to FIG. 13a but showing the latch mechanism in a locked position in which it is engaged with the stay member and the elongate load carrying member.
Figure 14B:
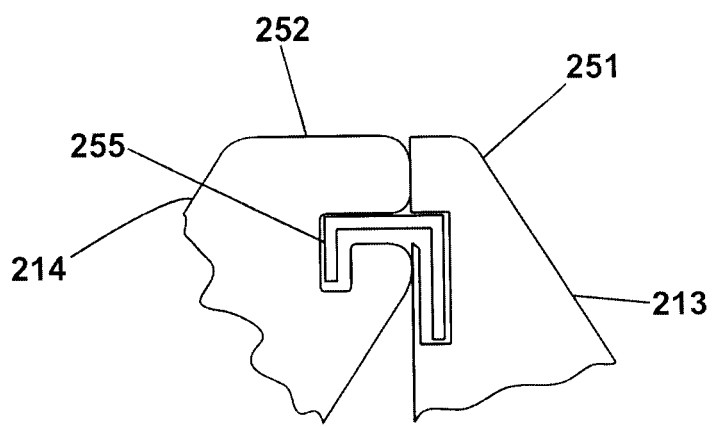

FIGS. 14a and 14b show the situation when the elongate load carrying member 213 and the stay 214 have been brought together to form the deployed state and have been secured or latched together by axially moving the rod 255 using the handle 222. The section corresponds to a section through one of the castellations 252 on the elongate stay 214 and to the section x-x on FIG. 15b. It will be appreciated that less castellations than those shown could be employed. It will be further appreciated that alternative types of securing means such as a mechanism activated at one end of the roof bar 10 by rotary motion could be used to replace the latch mechanism shown and described above. That is to say a rod with a number of hooks supported by one of the elongate load carrying member and the elongate stay could be rotatable in one direction so as to engage the hooks with apertures formed in the other of the elongate load carrying member and the elongate stay so as to clamp the two parts together and rotatable in an opposite direction so as to release the two parts so as to allow them to be stowed.

The roof bar 10 is fastened to the roof 5 of the vehicle 1 by a pair of base plates, 211, located at opposite ends of the roof bar 10.

Each of the base plates 211 has a respective support portion 218 of the single elongate stay 214 pivotally connected to it near to one end and a respective end portion 216 of the elongate load carrying member 213 pivotally connected to it near to an opposite end.

Figure 7:
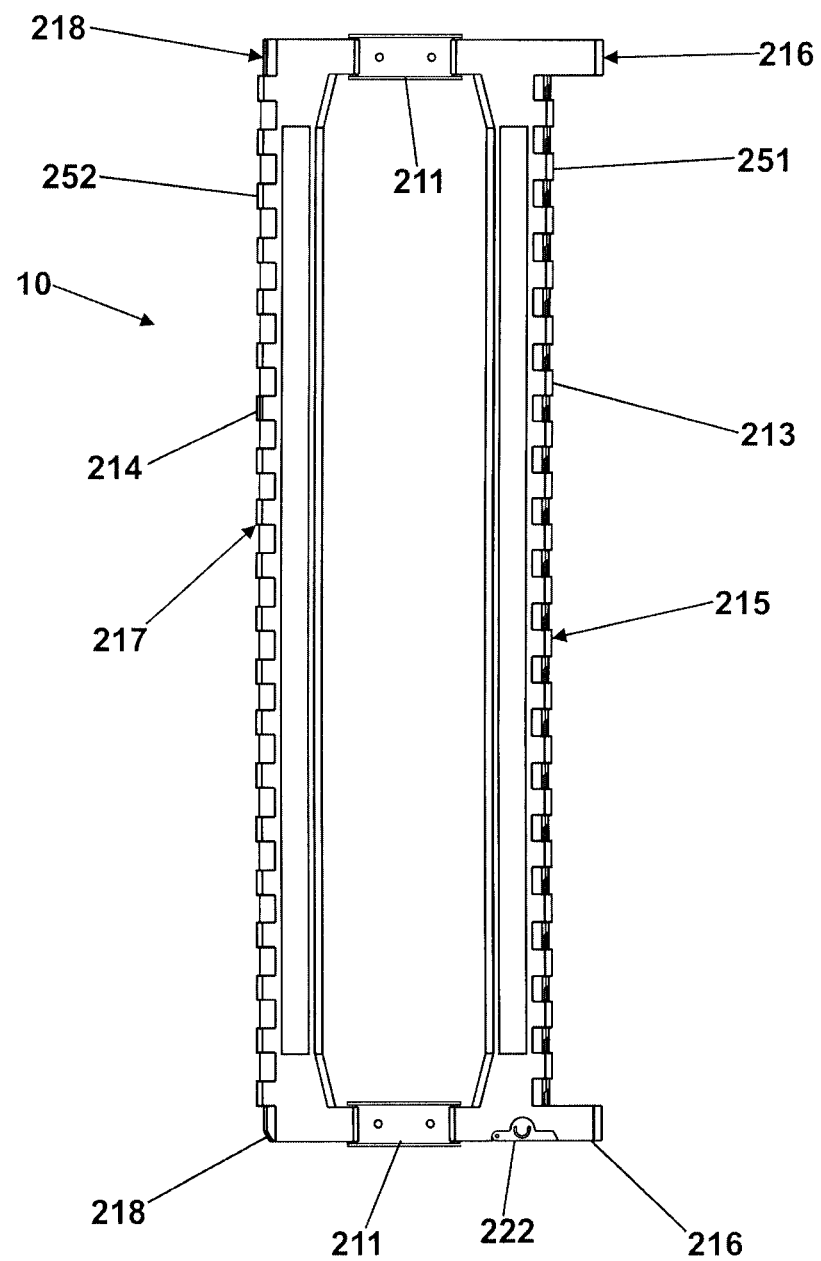
FIG. 7 is a plan view similar to that of FIG. 6 but showing the roof bar in a stowed state.
Figure 8:
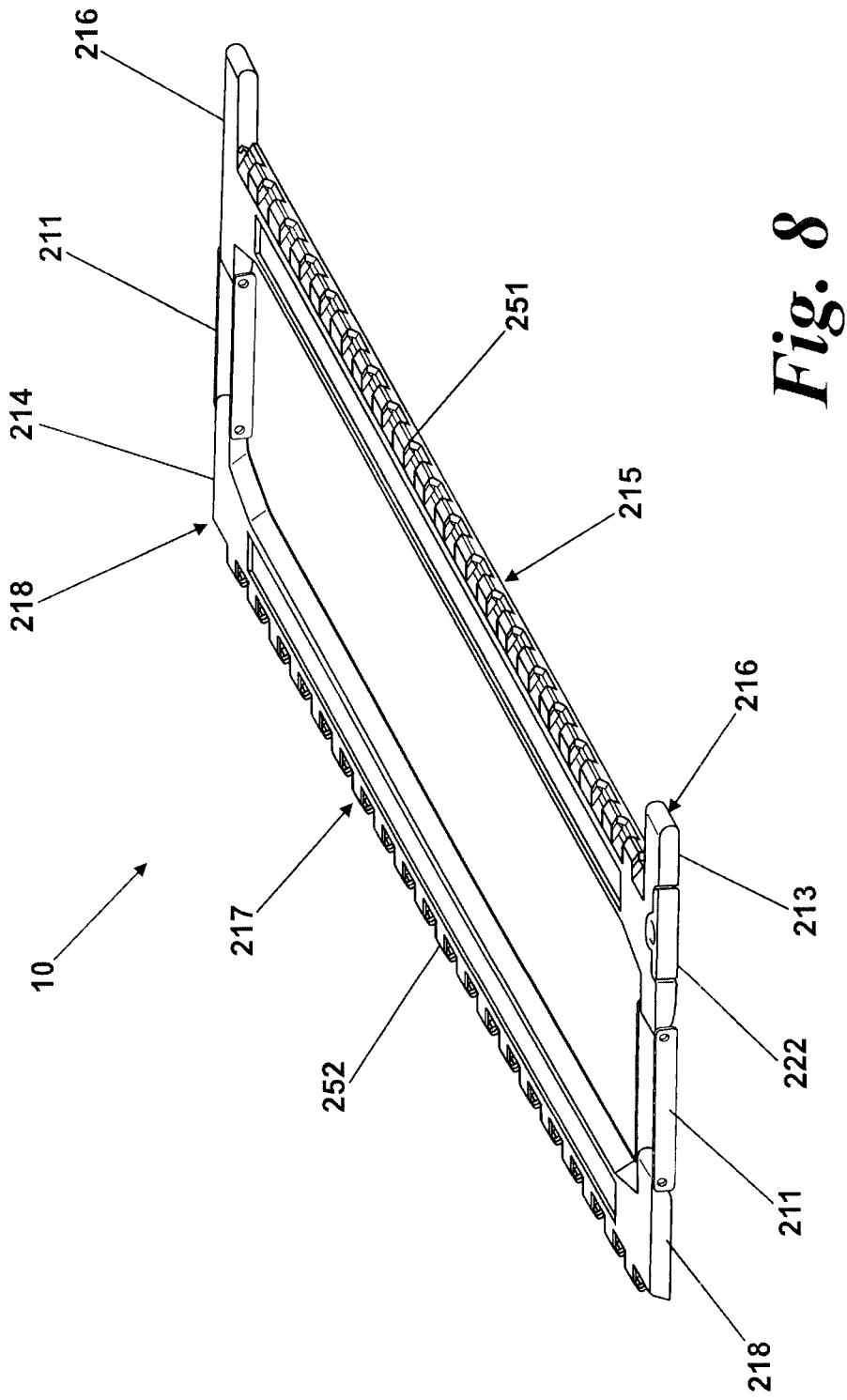
FIG. 8 is a pictorial view of the roof bar showing the roof bar in a stowed state.
Figure 11:
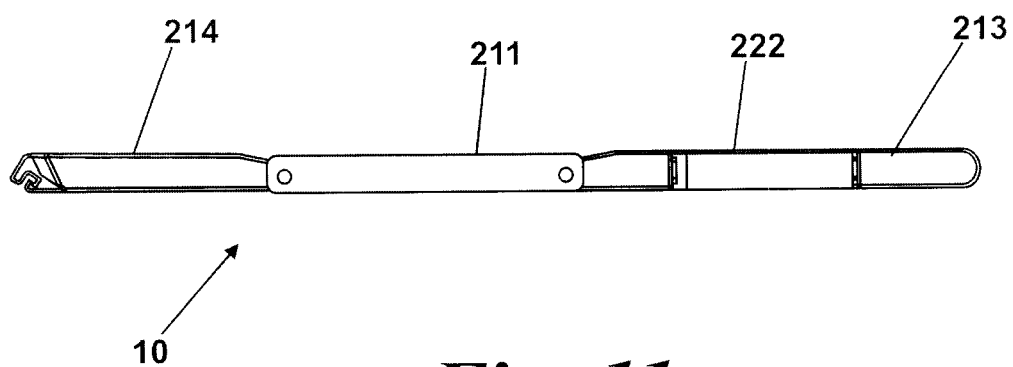
FIG. 11 is an end view of the roof bar shown in FIG. 7.

The connection of the elongate load carrying member 213 and the elongate stay 214 to the two base plates 211 is such that, when the elongate stay 214 is unlatched from the elongate load carrying member 214, the elongate load carrying member 213 is rotatable in one rotational direction so as to lie flat on the roof 5 of the vehicle 1 and the elongate stay 214 is rotatable in an opposite rotational direction so as to lie flat on the roof 5 of the vehicle 1 as best seen in FIGS. 7, 8 and 11.

The thickness of the elongate load carrying member 213 and the thickness of the elongate stay 214 are such that, when the roof bar 210 is moved to the stowed state, the highest point of the stowed roof bar 210 is lower than a high point on the roof 5 of the motor vehicle so that the overall height of the vehicle 1 is not increased. In most case this requires a thickness of between 15 and 20 mm to be used for these components and for the base plates 211.

One of the features of roof bar 10 is that the thickness of the crossbar portion 215 of the elongate load carrying member 213 is considerably less than the width of crossbar portion 215 and similarly, the thickness of central portion 217 of elongate stay 214 is considerably less than the width of central portion 217. This allows roof bar 10 when stowed to have minimal impact on the overall height of the vehicle 1 but when deployed have a high resistance to bending due to the relatively high second moment of area when roof bar 10 is in the deployed position. The use of asymmetrical sections for crossbar portion 215 and central portion 217 is therefore advantageous and desirable. Widths in the range of 50 to 125 mm could be used for crossbar portion 215 and central portion 217, whereas the thickness of these parts is typically in the range 15 to 20 mm.

Roof bar 10 is stowed in one of the open ended channels 8 formed in roof 5, as this enables the thickness of elongate load carrying member 213 and the thickness of elongate stay 214 to be greater than would otherwise be the case. If such a channel 8 is used it will be appreciated that it must be self draining and so must have a base surface 8b no lower than the height of any drainage channels or ditches 9 formed in roof 5.

It may also be desirable to use two channels to stow roof bar 10, one for elongate load carrying member 213 and one for elongate stay 214.

One advantage of this embodiment of a roof rack 10 is that the load bearing surface is not limited to the thickness of the crossbar portion 215 but is the sum of the top surfaces of the cross bar portion 215 and the central portion 217 of the single elongate stay 214, less the overlap of the castellations, the total of which is always greater than the thickness of the crossbar portion 215 alone.

In addition, if the top surfaces of cross bar portion 215 and central portion 217 are inclined relative to the sides of the respective portion 215, 217 (as can best be seen in FIG. 9) so as to be substantially horizontally arranged when the roof bar 10 is in the deployed position, the load bearing surface advantage is further increased because the width of the respective top surfaces of crossbar portion 215 and central portion 217 are wider than the respective thickness of these parts.

Another advantage of this invention is that the castellated latching of crossbar portion 215 to central portion 217 of single elongate stay 217 along a significant length of roof bar 10 greatly increases the stiffness of the roof bar 10 for horizontal and axial loads.

Operation of the handle 222 in a direction away from elongate load carrying member 213 slides the rod 255 so that single elongate stay 214 is unlatched, thereby allowing roof bar 10 to be stowed by rotating elongate load carrying member 213 in one rotational direction so as to lie flat on roof 5 of vehicle 1 and rotating single elongate stay 214 in an opposite rotational direction so as to lie flat on roof 5 of vehicle 1.

From the stowed position, rotation of elongate load carrying member 213 and single elongate stay 214 in the opposite directions used to stow the roof bar 10 brings the castellations 251, 252 into intermeshing engagement and moving the handle 222 towards the elongate load carrying member 213 then moves the rod 255 so as to latch the two parts 213, 214 together.

Although in most cases the number of channels formed in the roof of the vehicle will normally be the same as the number of roof bars fitted to the vehicle it will be appreciated that a roof could be formed with more channels than required to accommodate the fitted roof bars to allow for the fitting of more roof bars than normally fitted in the event that very heavy loads are to be carried.

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention as set out in the appended claims.

What is claimed is:

1. A stowable roof bar (10) for a motor vehicle (1) comprising an elongate load carrying member (213) pivotally connected to a roof (5) of the vehicle (1) so as to extend across said vehicle (1) and a latch mechanism (222, 255) to selectively hold the elongate load carrying member (213) in a deployed state in which a crossbar portion (215) of said elongate load carrying member (213) is spaced above the roof (5) of the vehicle (1), wherein a single elongate stay (214) is latchable by means of said latch mechanism (222, 255) to said elongate load carrying member (213) along the length of said elongate load carrying member (213) to hold said roof bar (10) in the deployed state;
wherein the latch mechanism (222, 255) is operable from one end of the roof bar (10) so as to permit the roof bar (10) to be stowed or deployed from one side of the vehicle (1) to which it is fitted.

2. A roof bar as claimed in claim 1 wherein the elongate load carrying member (213) comprises a crossbar portion (215) and an end portion (216) at each end of the crossbar portion (215) and the single elongate stay (214) comprises a central portion (217) and a support portion (218) at each end of the central portion (217).

3. A roof bar as claimed in claim 2 wherein the elongate load carrying member has a castellated edge (251) formed on the crossbar portion (215) and is latchable by means of the latch mechanism (222, 255) to a castellated edge (252) of the central portion (217) of the single elongate stay (214) so as to form a load bearing support when the roof bar (10) is in the deployed state.

4. A roof bar as claimed in claim 2 wherein the central portion (217) of the single elongate stay (214) is latched along its entire length to the crossbar portion (215) of the elongate load carrying member (213) by the latch mechanism (222, 255).

5. A roof bar as claimed in claim 2, wherein the roof bar (10) further comprises a pair of base plates (211) used to fasten the roof bar (10) to the roof (5) of the motor vehicle (1), each of the base plates (211) having a respective support portion (218) of the single elongate stay (214) pivotally connected to it near to one end and a respective end portion (216) of the elongate load carrying member (213) pivotally connected to it near to an opposite end.

6. A roof bar as claimed in claim 1 in which the roof bar is adapted to fit a roof (5) of a motor vehicle (1) having a high point and a low point and the roof bar (10) is fitted so as to be stowable in a open ended transverse channel (8) in the roof (5) wherein the thickness of the components forming the roof bar (10) are such that, when the roof bar (10) is moved to a stowed state, no part of the stowed roof bar (10) is located below the low point of the roof (5) and above the high point of the roof (5).

7. A roof bar as claimed in claim 6 wherein the roof bar is adapted to a accommodate a roof (5) of a motor vehicle (1) in which the roof has a high point and a low point, with the low point corresponding to a height below which the surface of the roof is not self draining, and a number of transverse open ended channels (8) each sized to accommodate a stowed roof bar (10), each of the channels (8) having a base surface (8b) located no lower than the low point of the roof (5) such that, when each roof bar (10) fitted to the roof (5) of the vehicle (1) is moved to its respective stowed state, no part of each stowed roof bar (10) is located higher than the high point of the roof (5) so that the overall height of the motor vehicle (1) is not increased by the stowed roof bars (10) and no part of each roof bar (10) is located lower than the low point of the roof (5).

8. A roof bar as claimed in claim 7 wherein each of the channels (8) has a base surface (8*b*) located no lower than the height of drainage ditches (9) so as to ensure that it is self draining.

9. A roof bar as claimed in claim 1 wherein the roof has a convex central portion (7) bounded on each side by a longitudinally extending drainage ditch (9) and the low point of the roof (5) corresponds to the height of the drainage ditches (9).

10. A roof bar as claimed in claim 1 wherein the latch mechanism includes an axially slideable J-shaped rod (255) that is moveable between an unlocked position in which it is engaged only with castellations (251) formed in said elongate load carrying member (213), and a locked position in which it is engaged with said castellations and with additional castellations (252) formed in said single elongate stay (214).

11. A roof bar as claimed in claim 1 wherein, when the single elongate stay (214) is unlatched from the elongate load carrying member (213), the elongate load carrying member (213) is rotatable in one rotational direction so as to lie flat on the roof (5) of the vehicle (1) to which the roof bar (10) is fitted and the single elongate stay (214) is rotatable in an opposite rotational direction so as to lie flat on the roof (5) of the vehicle (1).

12. A roof bar as claimed in claim 1 wherein the crossbar portion (215) is asymmetrical in cross-section having a thickness that is less than the width of the crossbar portion (215) so as to minimize the increase in vehicle height when the roof bar (10) is stowed while retaining a high resistance to bending when a load is carried on the roof bar (10) in the deployed state.

\* \* \* \* \*